(No Model.) 3 Sheets—Sheet 1.

H. A. TOBEY.
THERMOSTATIC REGULATOR.

No. 548,407. Patented Oct. 22, 1895.

Witnesses.
David C. Walter
Jos. H Blackwood

Inventor.
Henry A Tobey
by Wm. H. Doolittle
Atty (No Model.) 3 Sheets—Sheet 2.
H. A. TOBEY.
THERMOSTATIC REGULATOR.
No. 548,407. Patented Oct. 22, 1895.
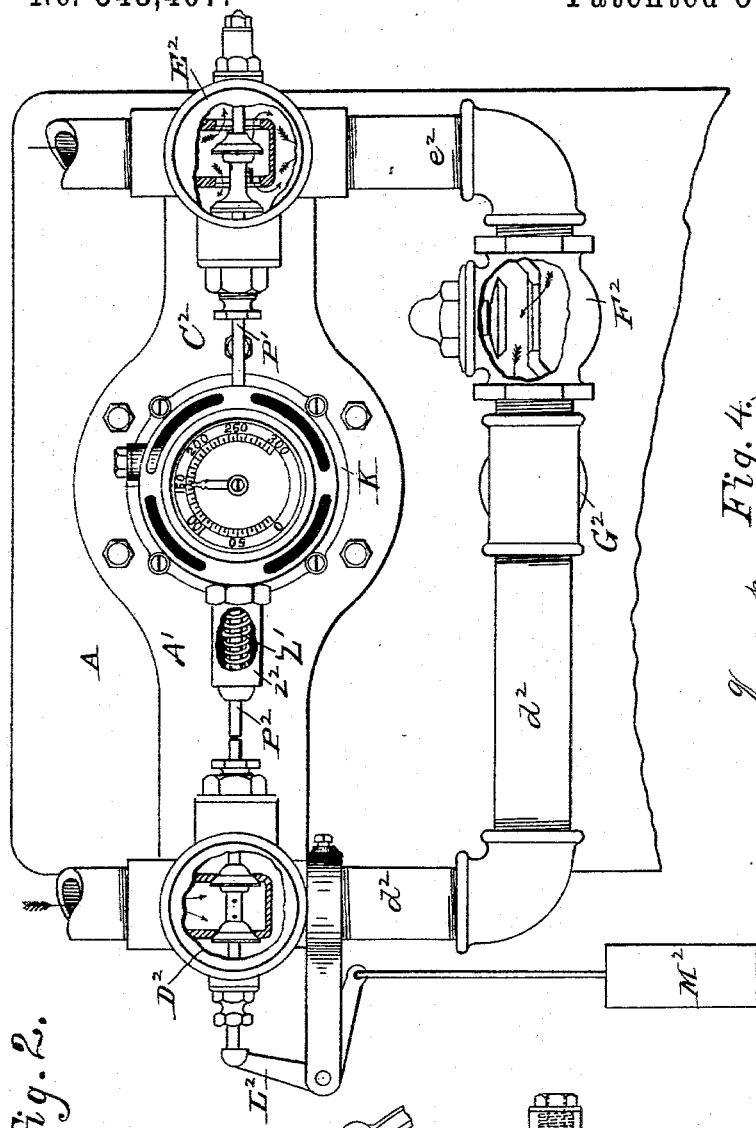
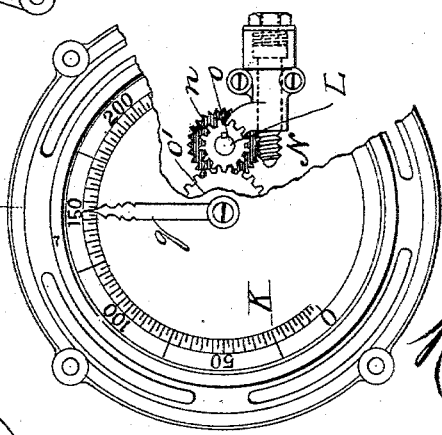
Witnesses.
David C. Walter
Jos. H. Blackwood
Inventor.
Henry A. Tobey
by W. H. Doolittle
Atty (No Model.) 3 Sheets—Sheet 3.

H. A. TOBEY.
THERMOSTATIC REGULATOR.

No. 548,407. Patented Oct. 22, 1895.

Witnesses.
David C. Walter
Jos. H. Blackwood

Inventor.
Henry A. Tobey
by Wm. H. Doolittle
Atty.

UNITED STATES PATENT OFFICE.

HENRY A. TOBEY, OF TOLEDO, OHIO.

THERMOSTATIC REGULATOR.

SPECIFICATION forming part of Letters Patent No. 548,407, dated October 22, 1895.

Application filed May 29, 1894. Serial No. 512,898. (No model.)

*To all whom it may concern:*

Be it known that I, HENRY A. TOBEY, a citizen of the United States of America, residing at Toledo, in the county of Lucas and State of Ohio, have invented certain new and useful Improvements in Thermostatic Regulators, of which the following is a specification.

My invention relates to and consists of a thermostatic device to be used automatically to maintain water or other flowing medium at practically a uniform temperature by controlling the supply of heat from any suitable source, and also for use in mixing liquids, gases, or vapors of varying temperatures and discharging them at a uniform temperature, in connection with an indicating mechanism for adjusting the device to any required temperature. These devces are illustrated in the accompanying drawings, in which—

Figure 1:
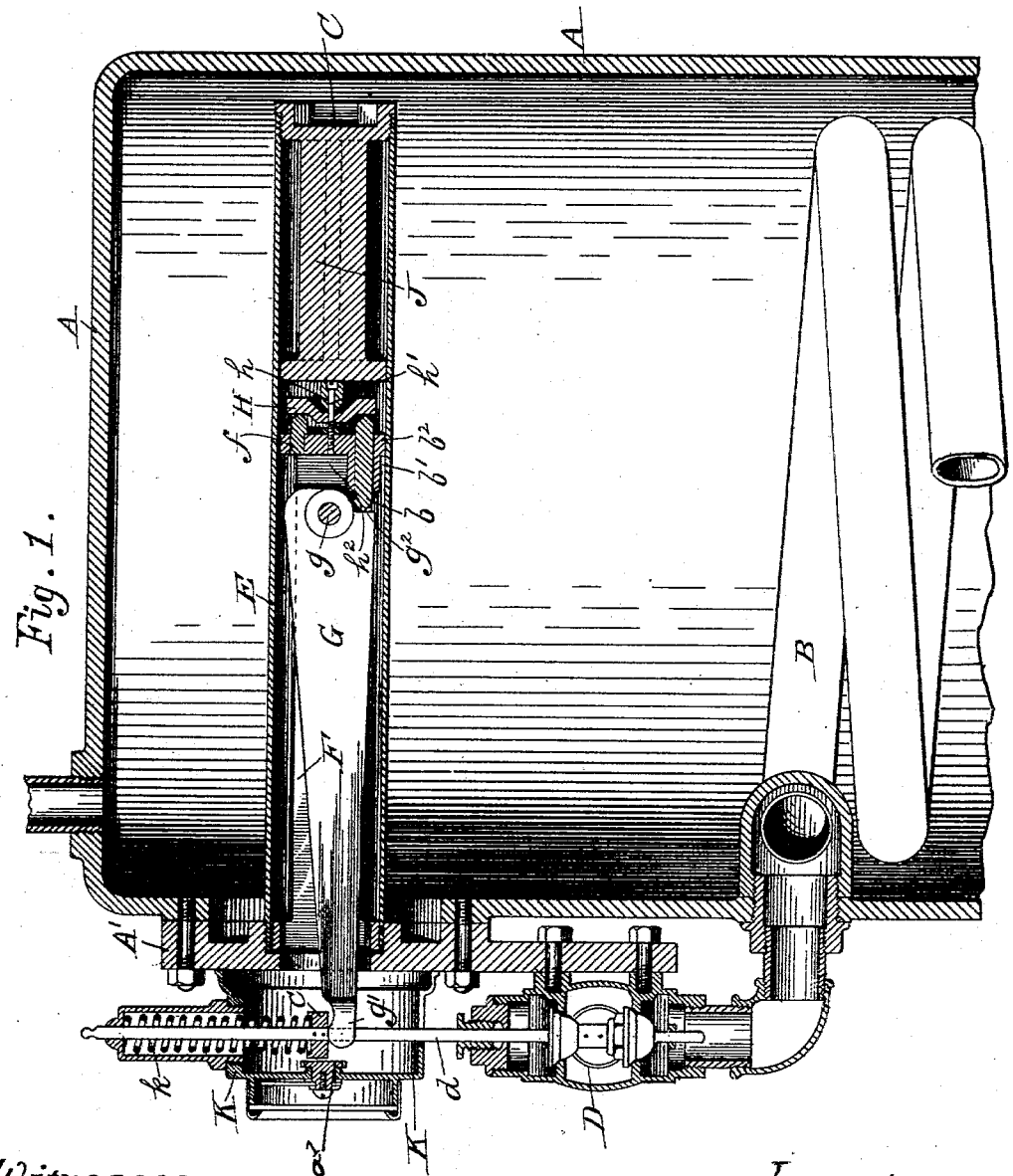
Figure 5:
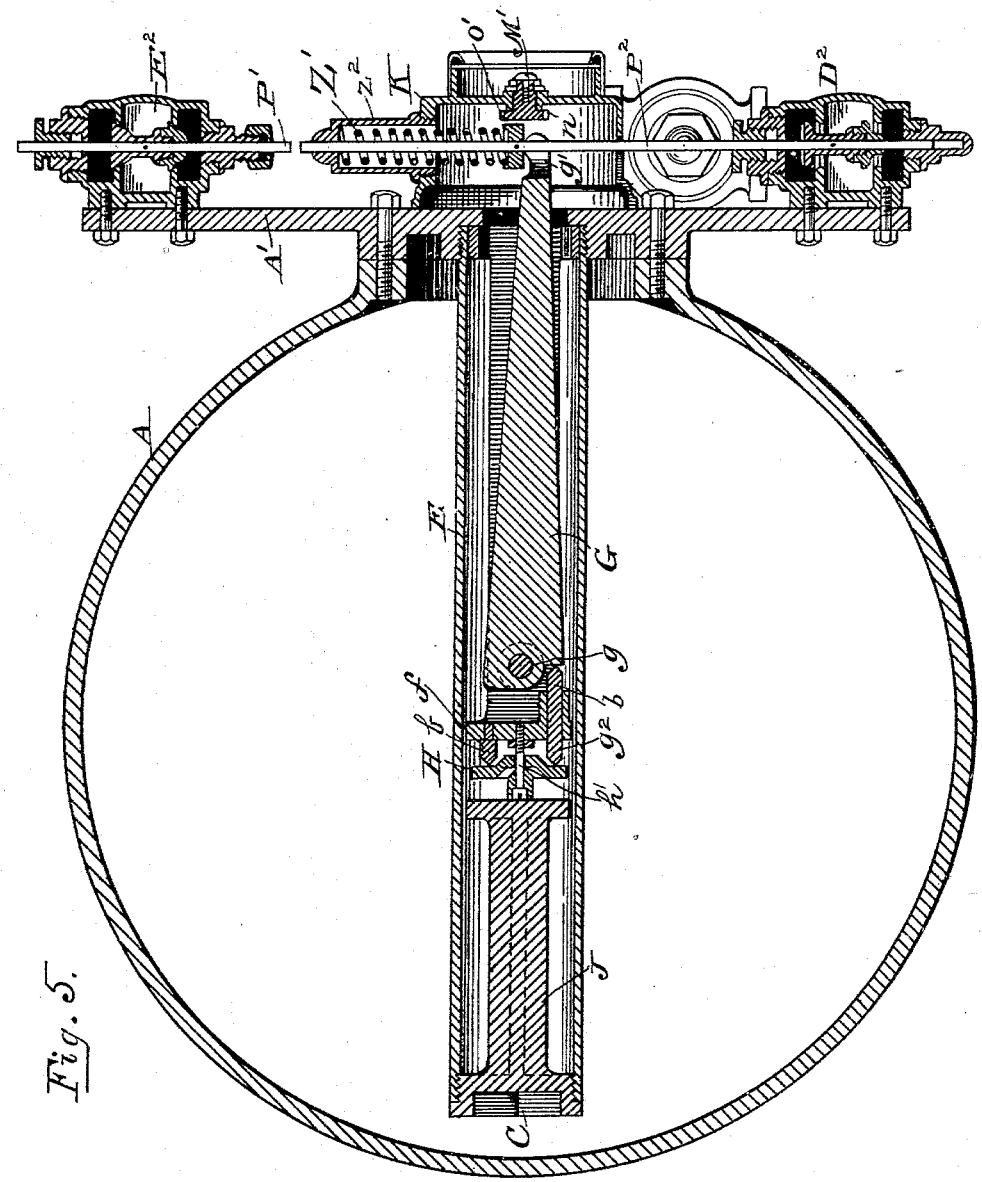

Figure 1 is a longitudinal section of the thermostatic apparatus, showing its application to a water-heater; Fig. 2, a face view, partly broken away and partly in section, of a modification, showing the application of the indicating mechanism to the water-heater; but the construction and arrangement of parts inside the heater are the same as shown in Fig. 1, the said parts being in a horizontal position in Fig. 2 and in a vertical position in Fig. 1; and Figs. 3 and 4, details of the temperature-indicating mechanism, Fig. 3 being a view of dial-plate and temperature-indicating hand thereon, the dial-plate broken away to show the controlling-gear; Fig. 4, a side sectional view of the controlling-gear with dial-plate removed; and Fig. 5, a horizontal sectional view through Fig. 2 on a central line through the valves and indicator, and also of a heater to which the same are applied.

Referring to the drawings, A is the shell or body of a water-heater, and B is a coil of pipe therein for heating the same, leading from any suitable supply of heat.

C represents, generally, the thermostatic device within the heater.

A' is an iron plate or casting securely bolted to the outside wall of the heater, to which is secured the expanding member of the thermostat, and to which also is secured the valve mechanism for controlling the supply of heat. The expanding member of the thermostat is a tube E, composed of a metal having a high expansive quality, preferably brass, one end of which is screw-threaded and screwed into a threaded recess in the plate A', while its opposite free and inner end is closed by a plug J.

Within the tube E is placed an open iron-cast frame F, composed of two parallel bars united at their ends. On this frame is hung a lever G, fulcrumed at $g$, which extends between the side bars of the frame out of the expanding tube and heater, through a slot in the plate A', and is bifurcated at its outer end $g'$ to embrace a valve-rod $d$, carrying a heat-controlling valve D. The lever G at one side of its fulcrum is provided with a shoulder $g^2$. Adapted to bear against this shoulder is a bar $b$, the opposite ends of which are edged to form steelyard-bearings. This bar $b$ reciprocates in a slot of an arm $b'$ on one side of a cross-head $b^2$ on the frame F. The opposite end of bar $b$ is adapted to bear against one end of a cross-plate lever H. This is a lever of the second class and is fulcrumed on edged bearing $h$, rigidly fixed to the head of the extended plug J, which fills the inner end of the expanding tube E.

The lever H is supported centrally by a screw-rod $h'$, but so as to slide and rock thereon, connecting the plug J and a cross-piece $h^2$ of the frame F. The opposite end of lever H is in contact with another but shorter edged rod $f$, fixed in cross-head $b^2$.

K is a case secured to the casting A' and forming a housing for spiral spring $k$ on the valve-stem $d$, and also a support and guide for said valve-stem. The spring $k$ is held on the valve-stem between the top of the casing and a block $c$ on the stem. The bifurcated free end of lever G, free to move on the valve-stem $d$, presses against the under side of this block $c$.

The operation of the parts, as shown in Fig. 1 and as thus far described, is as follows: Supposing the heater to be filled with water and the water in the upper portion of the heater to be at the required temperature with the steam-valve closed. Now when water is drawn from the heater cold water is admitted, lowering the temperature of the water in the heater. The expansion-tube E, being immersed in the water, will then contract or shorten, it being fixed at its outer end. The other end will move, imparting its motion through fulcrum $h$ to plate-lever H. One end of lever H being fixed by contact-bearing $f$ twice the amount of the movement of the tube E would be imparted to the opposite end of lever H, which, in turn, would be transferred by means of rod $b$ to shoulder $g^2$ of lever G, causing the lever to rock on its fulcrum $g$ and, raising its free end on valve-rod $d$ against block $c$ on valve-stem $d$, overcoming the force of spring $k$ on said rod and lifting the valve D to admit steam to the heating-surface B. When the water again becomes heated, the reverse of the operation takes place, closing the valve D and shutting off the steam.

The device for regulating the temperature consists of a shaft L, (see Figs. 3 and 4,) screw-threaded at its inner end and screwed through plate A' at one side of the slot through which lever G extends, said shaft impinging against the frame F at $m$. Therefore it is obvious that as the shaft L is screwed inward frame F, which supports fulcrum $g$ of lever G and carries contact-bearing $f$, will move inward, which will cause the free end of lever G to rise, opening the steam-valve D. It will then require a greater expansion of the tube E to allow the valve to close, and consequently a higher temperature of the water in the heater.

M is a piece of metal secured to plate A', which furnishes a bearing for the hollow nut M', carrying the worm N and a bearing for the outer end of shaft L, which carries a cog-wheel $n$ to engage worm N. On the outer end of shaft L is cog-wheel $o$, which engages cog-wheel $o'$ on a short shaft $p$, which has a bearing in the housing or casement K. Fixed on the outer end of shaft $p$ is a pointer or indicator-hand $q$. The face of the housing or casement K is graduated. This adjusting mechanism is shown in Figs. 1, 3, and 4, where the same letters indicate like parts. By turning worm N shaft L will be made to turn, revolving cog-wheels $o$ and $o'$, causing indicator-hand to move, and thus showing the temperature at which the water is fixed.

In Fig. 2 is shown a face view of my device applied to a water-heater and connected with two steam-valves, one for low-pressure or exhaust steam and the other for high-pressure or live steam, the object being to use low-pressure steam when sufficient and when not sufficient to admit enough high-pressure or live steam to make up the defficiency. $C^2$ is a plate or casting into which is secured the thermostatic device, which is secured to the shell A of the heater and which has secured to it valve $E^2$, a low-pressure steam-valve, and valve $D^2$, a high-pressure steam-valve. P' is the valve-stem of valve $E^2$ and is engaged with and operated by the lever G in the thermostat. Z' is a spring supported by a casement $z^2$ and secured in the housing which supports the temperature-regulating apparatus. Said spring Z' presses against the end of the lever and normally tends to close valve $E^2$. $P^2$ is the valve-stem of $D^2$, and valve $D^2$ is held closed or shut by weight $M^2$, hung to lever $L^2$, which presses against the outer end of valve-stem $P^2$.

The operation is as follows: When the water in the heater has cooled sufficiently to cause valve $E^2$ to open widely, as shown, the free end of valve-stem P' is brought into contact with the inner or free end of valve-lever $P^2$. Therefore it will be seen should the water in the heater continue to cool, there not being sufficient steam admitted by valve $E^2$ to maintain the temperature, valve $D^2$ would be opened, admitting live steam. The steam from valve $E^2$ to the heater is admitted by pipe $e^2$, through check-valve $F^2$ by pipe $G^2$, to the coil or heating-surface B of the heater. The check-valve is to prevent the high-pressure steam when admitted by valve $D^2$ and pipe $d^2$ from escaping through pipe $e^2$ and valve $E^2$.

Having thus described my device and its application, what I claim is—

1. In combination with a vessel, a heater within said vessel, a thermostatic tube also within said vessel, said tube closed at one end and attached to the vessel at the other end, a main lever fulcrumed within said tube, a regulating valve controlling the flow of the heating medium to the heater, and to the stem of which is connected said lever outside of said tube, a balanced lever within the tube and actuated thereby, and means for communicating the movement of said balanced lever to the said main lever, substantially as and for the purpose described.

2. The combination with a vessel of a heater within said vessel, a thermostatic tube within said vessel, said tube closed at one end and attached to the casing at the other end, a main lever fulcrumed within said tube, a regulating valve controlling the flow of the heating medium to the heater, to the stem of which valve is connected the outer end of said lever, a balanced lever within and connected to the closed end of said tube and actuated thereby to actuate said main lever, and an indicating and adjusting device secured to the outside of the vessel provided with a screw shaft to engage with the support of said main lever to set the same, a graduated face and pointer and an intermediate gearing connecting said screw shaft and pointer, substantially as and for the purpose described.

3. The combination with a vessel, of a heater and a thermostatic tube within said vessel, said tube closed at one end and attached at the other end to the vessel, a regulating valve controlling the flow of the heating medium to the heater, a lever pivoted at one end within and to said tube, and its opposite outer end connected with the stem of said valve, said lever actuated by said tube to govern said valve, a block on said stem against one side of which the outer end of said lever bears, a coiled spring on said stem bearing also on said block, a casing on the outside of the vessel inclosing said block, spring, and upper part of said stem, and a casing for said valve secured to the outside of the vessel and connected with the heat supply, substantially as and for the purpose described.

In testimony whereof I affix my signature in presence of two witnesses.

HENRY A. TOBEY.

Witnesses:
 E. A. HANNING,
 F. E. SNELL.